Jan. 27, 1942.　　　E. J. SERPAS　　　2,271,402
ROTARY INTERNAL COMBUSTION ENGINE
Original Filed Nov. 16, 1936　　10 Sheets-Sheet 1

Fig. 1

E. J. Serpas
INVENTOR.

Jan. 27, 1942. E. J. SERPAS 2,271,402
ROTARY INTERNAL COMBUSTION ENGINE
Original Filed Nov. 16, 1936 10 Sheets-Sheet 2

Fig. 2

E. J. Serpas
INVENTOR.

Jan. 27, 1942.  E. J. SERPAS  2,271,402
ROTARY INTERNAL COMBUSTION ENGINE
Original Filed Nov. 16, 1936  10 Sheets-Sheet 5

Fig. 5.

INVENTOR.

Jan. 27, 1942. E. J. SERPAS 2,271,402
ROTARY INTERNAL COMBUSTION ENGINE
Original Filed Nov. 16, 1936 10 Sheets-Sheet 6

E. J. Serpas
INVENTOR.

Jan. 27, 1942.  E. J. SERPAS  2,271,402
ROTARY INTERNAL COMBUSTION ENGINE
Original Filed Nov. 16, 1936  10 Sheets-Sheet 7

E. J. Serpas
INVENTOR.

E. J. Serpas
INVENTOR.

E. J. Serpas
INVENTOR.

Patented Jan. 27, 1942

2,271,402

UNITED STATES PATENT OFFICE 2,271,402

ROTARY INTERNAL COMBUSTION ENGINE

Ernest J. Serpas, New Orleans, La., assignor of two-fifths to J. S. Waterman, New Orleans, La.

Application November 16, 1936, Serial No. 111,091
Renewed October 7, 1939

8 Claims. (Cl. 123—43)

My invention relates to improvement in rotary internal combustion engines, in which an annular piston chamber, divided into equally spaced segments is rotatably mounted about a stationary crank shaft provided to carry pistons in an annular course. The torque, the action of the pistons, as well as the timing, is controlled by a simple combination of a connecting rod and toggle joint, which couples the pistons to the annular casing and to the crank shaft.

The objects of my invention are; first, to eliminate the hazard of leakage from the explosion chambers; second, to eliminate the use of gears for the transmitting of power; third, a novel means for supplying gas to the chambers under centrifugal force; and fourth, simplified means for operating interrupting points.

I attain these objects and other features, by mechanism illustrated in the accompanying drawings, in which.

Figures 15, 16, 17, 18, 19, 20, 21, and 22 are a series of views showing the structure of Figures 8 and 9 in its various positions during a complete revolution of the engine and shown revolving on the crank pin.

Similar numbers refer to similar parts through the several views.

Figure 1:
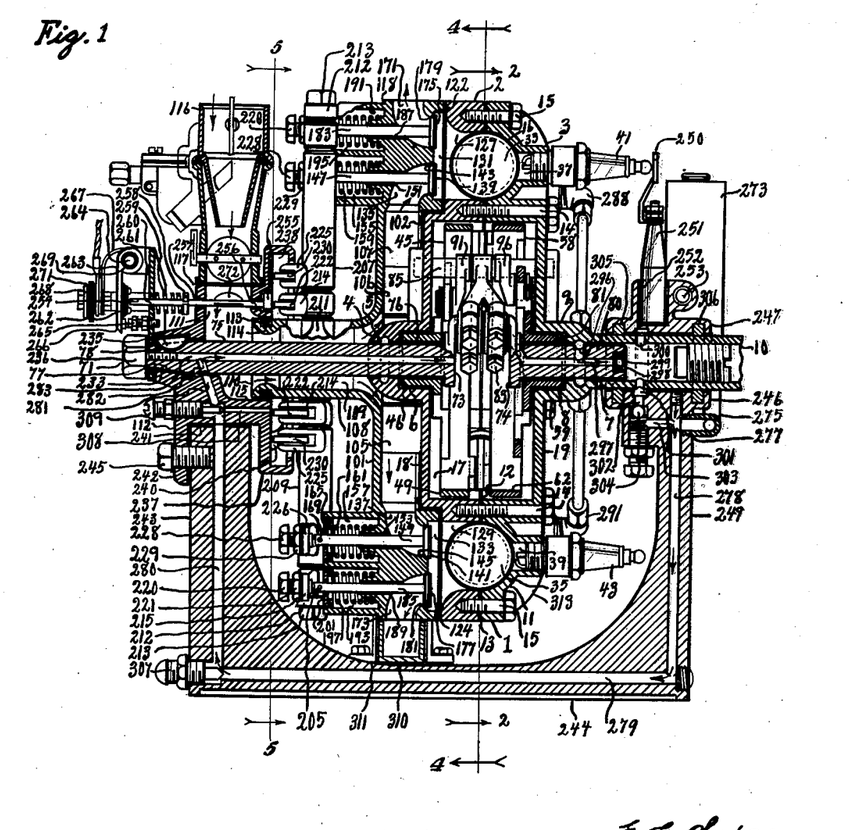
Figure 1 is a sectional view taken longitudinally of the shaft showing a vertical section of the entire machine.
Figure 2:
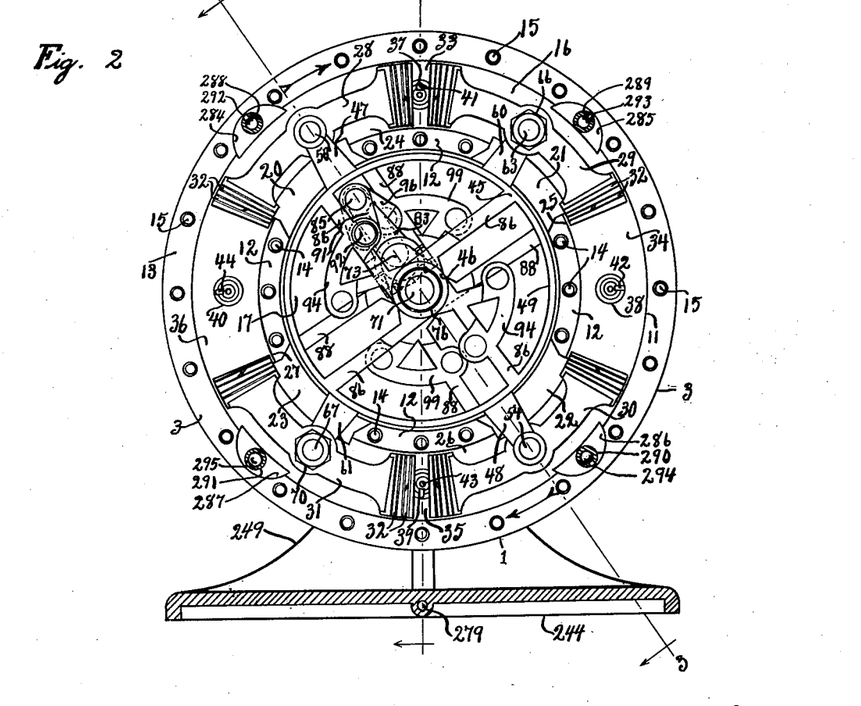
Figure 2 is an elevation taken on line 2—2 of Figure 1 looking in the direction of the arrow showing the rotor as it appears after removing one of the castings.

In these views, 1 indicates a circular casing constituting castings 2 and 3, shown in Figures 1 and 2. The hub 4 of casting 2 is bored at 5 and counterbored at 6 and concentric to the bore 7, and counterbore 8 respectively in the hub 9 of casting 3. The hub 9 is extended and terminates into drive shaft 10 for transmitting of power and serves as an axis for rotating the casing.

A cylindrical annular casing 11 is formed by the castings 2 and 3 which are secured together sealed tight at two annular points of contact 12 and 13 by two circular rows of bolts 14 and 15, respectively. The cylindrical annular space enclosed by casing 11 constitutes the annular piston chamber 16.

A discular space 17 is formed between the discular wall portion 18 of casting 2 and discular wall portion 19 of the casting 3, concentric to bore 5 and bore 7, and surrounded by the cylindrical annular piston chamber 16, constitute the crankcase.

Figures 6, 7:
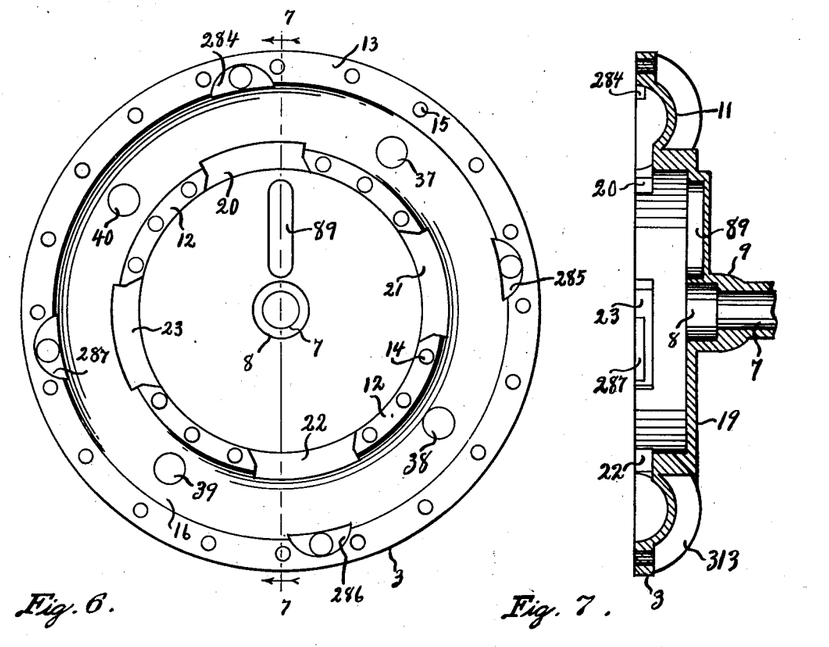
Figure 6 is an elevation showing one of the castings which forms the casing.
Figure 7 is a sectional view of the casting taken on line 7—7 of Figure 6 showing one of the radial grooves which acts as a cross head guide.
Figure 8:
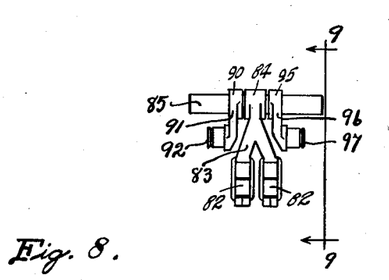
Figure 8 is a detailed elevation showing the connecting rod, the wrist pin shaft, and the toggle joint links assembly.

Four equally spaced slots 20, 21, 22, and 23, shown clearly in Figures 6 and 7, are formed between the castings 2 and 3 cutting through the cylindrical annular casing 11, along the annular point of contact 12, dividing the annular piston chamber 16 into four equally spaced segments 24, 25, 26, and 27, which receive four double headed pistons 28, 29, 30, and 31, each of which are provided with piston rings 32 for contacting the cylindrical annular casing 11 in order to seal the spaces between the piston heads, which constitute the explosion chambers 33, 34, 35, and 36. Spark plug ports 37, 38, 39, and 40 are provided equally spaced in the annular casing 11 of casting 3, communicating with the explosion chambers and to receive the spark plugs 41, 42, 43, and 44, which are carried in an annular course and are provided for igniting the gas.

Figure 24:
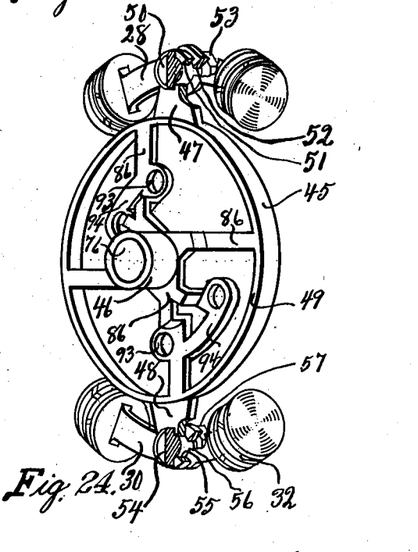
Figure 24 is a perspective view of the piston carrying wheel 45 and pistons 28 and 30 assembly. The pistons and radial projections are also partly cut away to show clearly the manner in which they are assembled.
Figure 25:
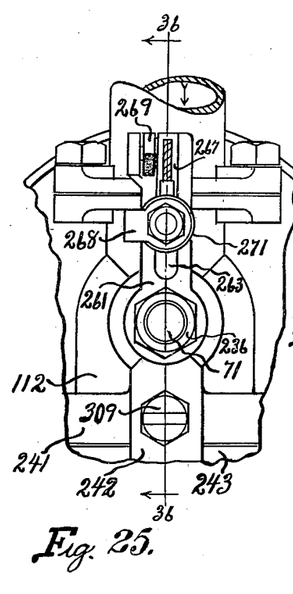
Figure 25 is a cut away section of the engine showing the ignition structure on a larger scale.
Figure 26:
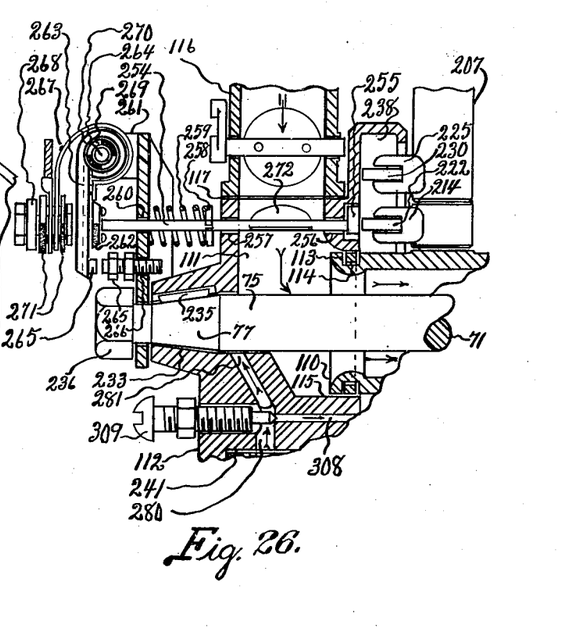
Figure 26 is a view of Figure 25 taken longitudinally of the crank shaft and taken approximately on the line 26—26 looking in the direction of the arrow showing the manner in which the ignition system is actuated.

The piston carrying wheel 45, more clearly shown in Figures 1 and 2, and disposed in the crank case 17, shown in detail in Figure 24 is rotatably mounted on its hub 46 engaging counterbore 6 in casting 2, and provided with radial projections 47 and 48 diametrically opposite each other, and extending from the rim portion 49 through the slots 20 and 22, reaching to one side of and coupled to the pistons 28 and 30 by shaft bolt means. The shaft bolt 50 is rotatably mounted in the bearing 51 of the radial projection 47, secured to the piston 28 at bearing 52 by the lock nut 53, and the shaft bolt 54 is rotatably mounted in bearing 55 of the radial projection 48, secured to the piston 30 at bearing 56 by lock nut 57.

Figure 23:
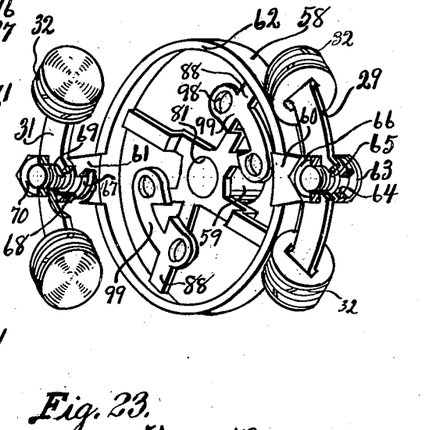
Figure 23 is a perspective view of the piston carrying wheel 58 and pistons 29 and 31 assembly. The pistons and radial projections are partly cut away to show clearly the manner in which they are assembled.

The piston carrying wheel 58 in the crank case 17, shown in detail in Figure 23 is rotatably mounted on its hub portion 59, engaging counterbore 8 in the casting 3, and provided with radial projections 60 and 61 diametrically opposite each other extending from its rim portion 62 through the slots 21 and 23, and reaching to one side of and coupled to the pistons 29 and 31 by shaft bolt means, the shaft bolt 63 rotatably mounted in the bearing 64 of radial projection 60 secured to piston 29 at bearing 65 by lock nut 66 and the shaft bolt 67 rotatably mounted in the bearing 68 of the radial projection 61 secured to piston 31 at bearing 69 by lock nut 70.

Pistons 28 and 30 carried on the piston carrying wheel 45 and pistons 29 and 31 carried on the piston carrying wheel 58, are mounted independently of each other and free, to a certain degree, to oscillate in respect to each other, and to the casing, in order that the speed of the piston carrying wheels 45 and 58 and consequently the pistons be accelerated positively and negatively and that the magnitude of their acceleration be alternated in each quarter of the circle as they are carried in the casing.

Figure 3:
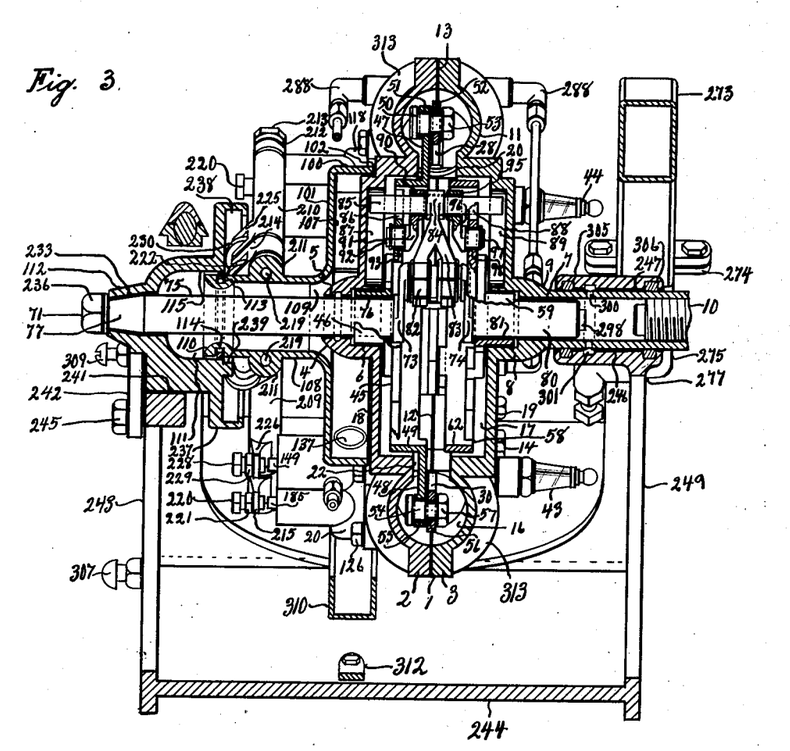
Figure 3 is a sectional view through the entire machine taken approximately on line 3—3 of Figure 2 to show the radial guides carried by the annular casing which acts as a crosshead for the connecting rod and serves to apply the torque to the casing.

A stationary crank shaft, generally indicated at 71 is provided axially of the castings 2 and 3 and of the piston carrying wheels 45 and 58, see Figures 1 and 3. Its crank pin portion 72 and webbed portions 73 and 74 lie between the piston carrying wheels 45 and 58. The main shaft portion 75 of the crank shaft, engages the bore 76 in the piston carrying wheel 45 and extends through and beyond the bore 5 in casting 2, and is provided with a tapered end 77, key seat 78 and threaded portion 79 for anchoring the shaft, while the main shaft portion 80 engages bore 81 in the piston carrying wheel 58 and extends into bore 7 of casting 3.

Figure 4:
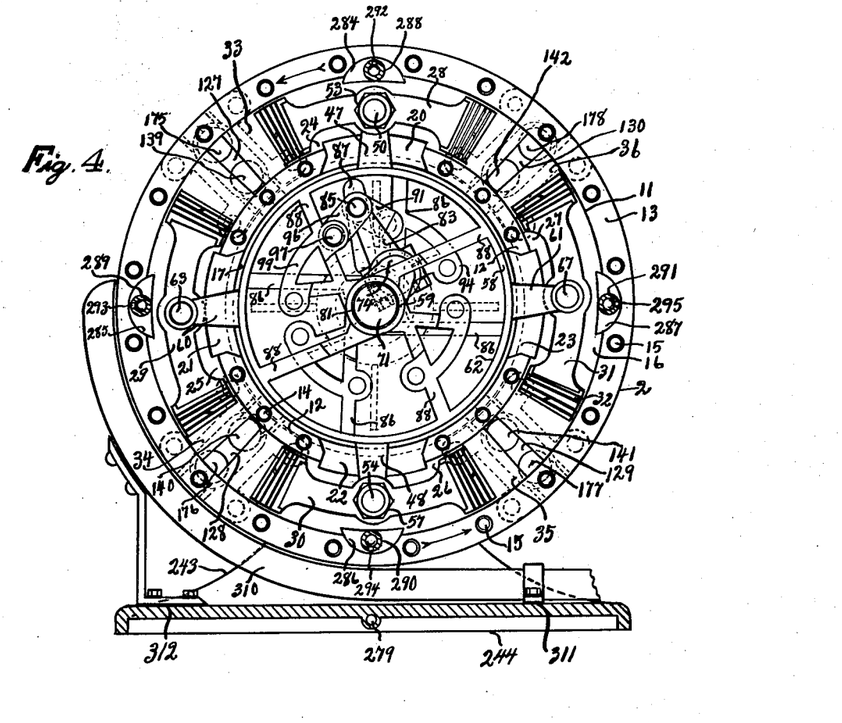
Figure 4 is an elevation taken approximately on line 4—4 of Figure 1 looking in the direction of the arrow showing the rotor after being revolved one eighth of a turn showing the ports which connect the valve chambers to the explosion chambers, partly showing the valves through the ports, and also showing a diagrammatic outline of the valve chambers.

The end portions 82 of the connecting rod 83 is rotatably coupled to the crank pin 72, the rod extends in a radial plane between the piston carrying wheels 45 and 58, see Figures 3 and 4, and its end portion 84 is coupled to the wrist pin shaft 85 which extends across the crank case 17 and through the connecting rod reaching between the spokes 86 of the piston carrying wheel 45 and engages the radial groove 87 in the discal wall 18 of casting 2, reaching from the opposite side of the connecting rod 83, the wrist pin 85 extends between the spokes 88 of the piston carrying wheel 58 and engages the radial groove 89 in the discal wall 19 of casting 3.

The wrist pin shaft 85 is adapted to freely slide in radially toward and from the center of crankshaft 75, grooves 87 and 89 and serves to apply torque to the casing and to guide the rod in a radial plane when the casing is made to revolve.

The end portion 90 of the link 91 is rotatably coupled to the wrist pin 85, while its shaft end portion 92 extends from the wrist pin and couples to the piston carrying wheel 45 at the bearing 93 in the boss 94 carried by one of the spokes 86. See Figures 15, 16, 23, and 24.

The end portion 95 of the link 96 is rotatably coupled to the wrist pin 85, while the shaft end portion 97 extends in the opposite direction to that of the shaft end portion 92 of link 91, and couples to the piston carrying wheel 58 at bearing 98 in the boss 99 carried by one of the spokes 88.

Figure 9:
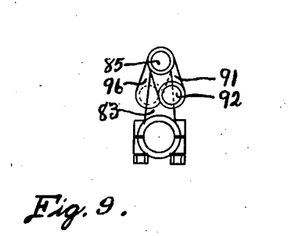
Figure 9 is an elevation taken on line 9—9 of Figure 8.
Figure 10:
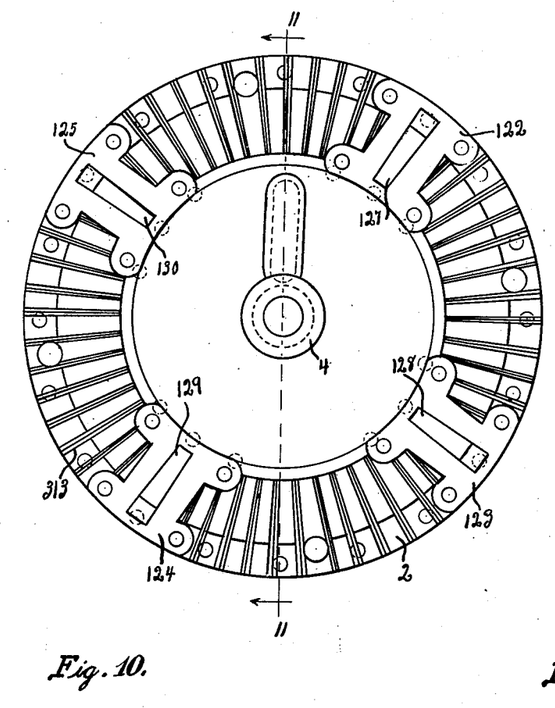
Figure 10 is a detailed elevation showing a casting which forms the other half of the annular casing.
Figure 11:
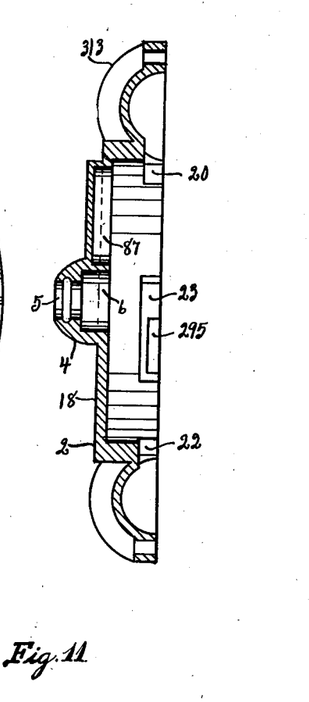
Figure 11 is a detailed sectional view taken on line 11—11 of Figure 10, showing a radial groove in the discular wall part of the casting.
Figure 12:
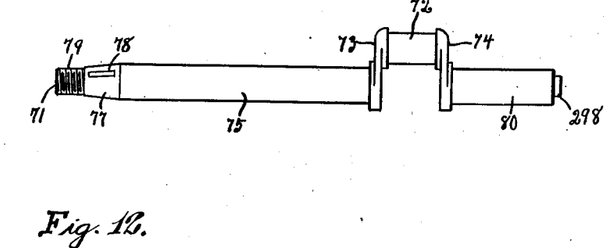
Figure 12 is a detail elevation showing the crank shaft.

It is apparent that the links 91 and 96 coupled to wrist pin shaft 85, and the connecting rod 83 and crank pin 72, the casing, and having their ends extending in opposite directions and coupled to the piston carrying wheels 45 and 58 serve to apply the force expanded between the pistons to revolve the casing 1, the piston carrying wheels and consequently the pistons and delivering power to the drive shaft 10, and to cause the speed of the piston carrying wheels and consequentially the pistons, to be accelerated positively and negatively relative to the speed of the casing, and to alternate the magnitude of the speed of the piston carrying wheels 45 and 58 and consequently the pistons through each quarter of the circle in order that four explosions occur in each revolution as the casing is revolved. This feature is best illustrated in Figure 2 showing firing chamber 35, Figure 9 showing firing chamber 36, Figure 10 showing firing chamber 35 and Figure 11 showing firing chamber 34 all of which are shown in firing position.

The rim portion 100 of the drum shaped casting 101 forms a tightly sealed joint at 102 with the discular wall portion 18 of the casting 2. See Figure 3. The discular space formed in the drum casting between the discular wall portion 18 and the impellers 103, 104, 105, and 106 constitute the centrifugal gas chamber 107.

The tubular hub 108 provided centrally of the drum casting 101 and extending therefrom and surrounding the crank shaft portion 75 and communicating with the centrifugal gas chamber 107 forms the intake manifold 109 for supplying gas to the chambers. The end portion 110 of the tubular hub 108 enters into and engages one end of the circular L chamber 111 formed in the anchor bearing 112. See Figure 1. The ring groove 113 in the end portion 110 of the tubular hub 108 receives the sealing ring 114 contacting the circular wall portion 115 of the L chamber, serves to seal and permit rotary connection of the tubular hub 108 in the anchor bearing 112.

Carburetter 116 is connected to the anchor bearing 112 at 117 and communicates with the L chamber 111, intake manifold 109 and the centrifugal gas chamber 107.

The drum shaped casting 101 is further provided with four radial extending portions 118, 119, 120, and 121 equally spaced and extending from the periphery of its rim portion 100 all of which are faced in one plane and engage the wall portions 122, 123, 124, and 125 of the casting 2. See Figure 5. The radial extending portions are each provided with four screw bolts 126 in openings 126' for securing the drum shaped casting 101 to the casting 2.

Ports 127, 128, 129, and 130 in the cylindrical annular wall portion 11 in casting 2, see Figures 1 and 10, connect the explosion chambers 33, 34, 35, and 36 with the valve chambers 131, 132, 133, and 134 formed between the casting 2 and in the radial extending portions 118, 119, 120, and 121 of the drum shaped casting 101.

The intake ports 135, 136, 137, and 138 all in a circular row and in the radial extending portions of the drum shaped casting 101 connect the valve chambers 131, 132, 133 and 134 to the centrifugal gas chamber 107 and are controlled by the inlet valves 139, 140, 141, and 142 which are adapted to coact the valve seats 143, 144, 145, and 146 for controlling the flow of gas to the explosion chambers. The valve stems 147, 148, 149, and 150 engage the valve guide bearings 151, 152, 153, and 154 and they extend through the valve spring chambers 155, 156, 157, and 158 engaging the valve springs 159, 160, 161, and 162, the spring retainers 163, 164, 165, and 166 which are guided in the walls of the valve spring chambers and are secured to the valve stems by the lock pins 167, 168, 169, and 170.

The exhaust ports 171, 172, 173, and 174 all in a circular row and one of greater radius than that of the circle on which the intake ports lie connect the valve chambers 131, 132, 133, and 134 to the atmosphere and are controlled by the exhaust valves 175, 176, 177, and 178 which engage the valve seats 179, 180, 181, and 182 for releasing the exhaust gases. The valve stems 183, 184, 185, and 186 engage the valve guide bearings 187, 188, 189, and 190 and they extend through the valve spring chambers 191, 192, 193, and 194 engaging the valve springs 195, 196, 197, and 198, the valve spring retainers 201, and 202 which are secured to the stems by the lock pins 203, 204, 205, and 206.

The valve actuating units 207, 208, 209, and 210 are all of a like construction and radially carried between the lugs 211 formed in the tubular hub 108 and the lugs 212 formed in the wall of the valve spring chambers 191, 192, 193, and 194 and pivoted thereto by the pivot bolts 213.

Figure 5:
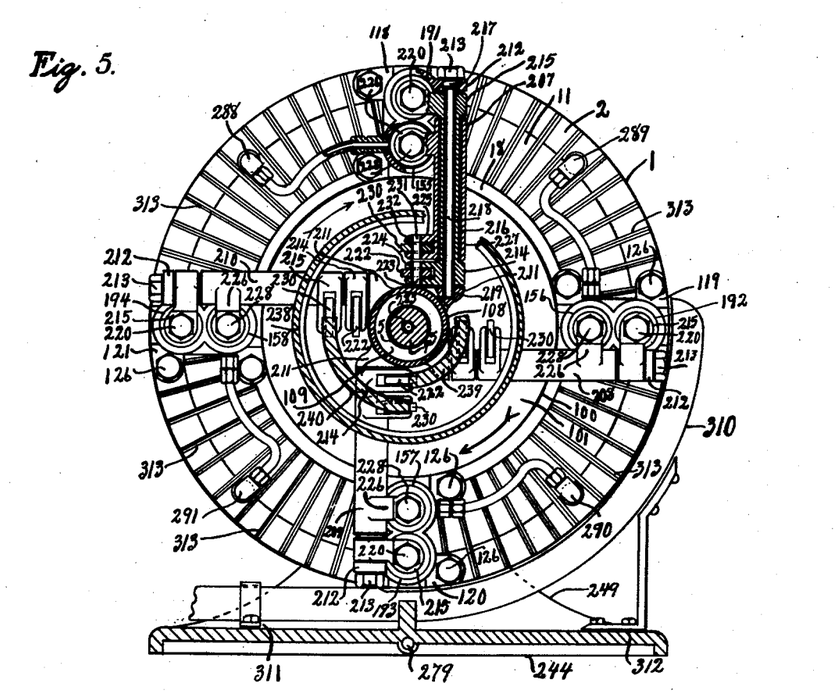
Figure 5 is an elevation taken approximately on line 5—5 of Figure 1, and looking in the direction of the arrow showing the valve actuating mechanism. One of the rocker arm units is shown in section and the manner in which the fuel and valve chamber unit is secured to the annular casing.

Each of the valve actuating units constitutes rocker arms 214 and 215 carried at each end of and fixed to the tubular shaft 216 carried between the lugs 211 and 212, see Figure 5, and rotatably mounted on the pivot bolt 213 threaded at 217 in the lug 212 and its long extending stem portion 218, reaching through the tubular shaft 216 engaging bearing 219 in lug 211. The tap screw 220, lock nut 221 are provided on the rocker arm 215 for engaging the exhaust valves stems and for adjustment of valve clearance, while the roller 222 rotatably mounted on the shaft 223 secured in the end bearing 224 of the rocker arm 214 is adapted for engaging the exhaust cam. The rocker arms 225 and 226 are carried at each end of and fixed to the tubular shaft 227 which is rotatably mounted on the tubular shaft 216 and between the rocker arms 214 and 215. The tappet screw 228 and lock nut 229 are provided in the rocker arm 226 for engaging the intake valve stem and for adjusting valve clearance while the roller 230 rotatably mounted on the shaft 231 in the end bearing 232 of the rocker arm 225 is adapted for engaging the intake cam.

The anchor bearing 112 is provided with hub bore 233 and key seat 234 to receive key 235 and the taper end portion 77, of the crank shaft 71 secured therein a fixed position and clamped by nut 236 engaging the threaded portion 79. See Figures 1 and 3. The anchor bearing 112 is further provided with the flange portion 237, surrounding the end portion 110 of the tubular hub 108 having recess rim portion 238, the exhaust cam 239, and the intake cam 240, which faces the valve actuating units. The exhaust cam 239 on the flange portion 237, is located at a proper radius, and in a fixed position, in order to engage the rollers 222 carried on the rocker arms 214. The intake cam 240, provided on the flange 237, is at a greater radius from the crank shaft 71 than the exhaust cam 239 and is in a fixed position to engage the rollers 230 carried in the end of the rocker arms 225 in order to operate the valves in proper timing, when the annular casing is rotated.

Figure 13:
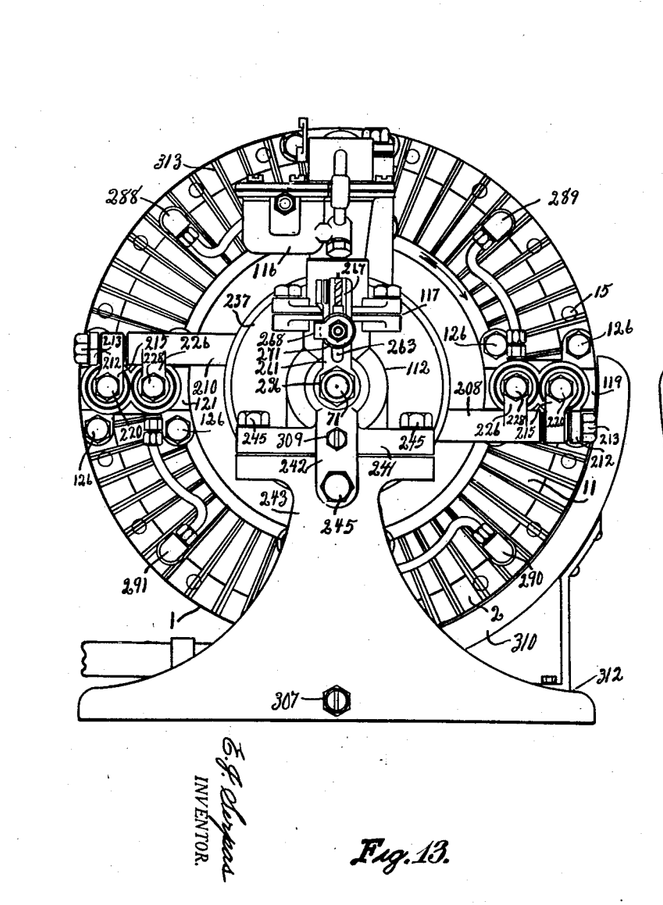
Figure 13 is an end view of the entire machine showing the carburetter secured to the anchor bearing, the manner in which the anchor bearing is secured to the support of the base plate, and the ignition points.

See Figures 1 and 13. The seat part 241, and the brace portion 242 of the anchor bearing 112, engages the stanchion portion 243 of the base plate 244 and is secured thereto by the bolts 245 for supporting the anchor bearing. See Figures 1 and 14. The bearing 246 is provided with bearing cap 247 and bolts 248 formed in the end portion of the stanchion 249 receiving the driving shaft 10 and is provided for supporting the rotor.

The electrode 250 secured to the porcelain post 251 carried in the socket 252 formed in the bearing cap 247 and clamped therein by bolt 253 is provided for transmitting an electric current to the spark plugs as they pass near the electrode in their annular course.

The ignition shaft 254 provided with the cam portion 255 engages the bearings 256 and 257 in the anchor bearing 112 passes through the L chamber 111 and provided with spring retainer 258 and extends through spring 259 engaged between the spring retainer and at one side of bearings 260 in base plate 261 which is secured to the anchor bearing 112 by the nut 236. The shaft projects through bearing 260 and abuts the insulator part 262 carried on the contact arm 263 which is pivoted at 264 to the base plate 261 to engage the contact screw 265 threaded at 266 in the base plate 261. The leaf spring 267 secured to bracket 268 urges the arm to its normal position. The insulator bushing 269 in the eye 270 of contact arm 263 and the insulated parts 271 on the bracket 268 are provided to direct an electric current through the contact arm 263 and contact screw 265. In order to interrupt the ignition primary circuit in proper timing the rollers 222 carried in the rocker arms 214 engage the ignition shaft 254 causes it to move laterally as they pass over its cam portion 255 and against the force of the spring 259, which returns the shaft to its normal position when the rollers pass out of engagement. The lateral motion of the shaft causes it to abut the contact arm at insulator 262 to break the electric contact at 265.

The fin 272 projecting from and at one side of the ignition shaft 254 and in the L chamber 111 is provided for revolving the ignition shaft in order that the engagement of the rollers 222 to the cam portion 255 of the shaft is advanced and consequentially advancing the ignition, as the engine's speed is increased, due to the force of the inrushing gas to the engine acting on the sides of fin 272 causes it to rotate the shaft and against the action of spring 259 to find a position of least resistance.

In order to lubricate the engine the oil reservoir 273 is provided and secured to the bracket 274 formed on the stanchion 249, sufficiently high above the axis of the motor and provided with the pipe 275 connected at the lower end of the reservoir at 276 and to one side of the stanchion at 277. In order that the oil may flow to the crank shaft and motor bearings under gravity force the reservoir 273 is connected to the crank case through the pipe 275, conduit 278 in the stanchion 249, the conduit 279 in the base plate 244, conduit 280 in the stanchion 243, conduit 281 in the anchor bearing 112, and through the port 282 and the bore 283 through the crank shaft portion 75. The oil once reaching the crank case lubricates the internal parts and is then carried out by centrifugal force into the annular piston chamber 16 and into the oil recess 284, 285, 286, and 287 finding its way into the U shaped conduits 288, 289, 290, and 291 by way of the orifices 292, 293, 294, and 295, and forced through the U shaped conduits to the hub portion 9 of the casting 3 for conducting the oil to the bore 7 in the hub, thence through the port 296 and bore 297 in the crank shaft portion 80 and following out through the center of the crank pin 72 and lubricating the connecting rod bearing, finding its way back into the crank case. Each of the U shaped conduits 288, 289, 290, and 291 are connected to the valve spring chambers 155, 156, 157, and 158 in order that pulsation of pressure, caused by reciprocating action of the valve spring retainers which are snugly fitted to the walls of the valve spring chambers, is applied to each of the U shaped tubes connected thereto for forcing the oil against the action of centrifugal force into bore 7 in the hub 9 of casting 3 in order to circulate the oil. In order to control the pressure of the oil in the crank-shaft a resistant plug 298 having an orifice 299 of sufficient size to attain a predetermined pressure is provided in the end 80 of the shaft 71 in order that the excess oil may flow through the orifice into the hollow member portion of the drive shaft 10, thence through the ports 300 and into the recess 301 in bearing 246 and bearing cap 247, and follow out through the conduits 302 and 303 leading back to the tank and part of which flows back to the crank case. The spring press ball check valve 304 is provided in the conduit 302 for controlling the return of the oil. The oil packing rings 305 and 306 are provided at each side of the bearing 246 and bearing cap 247 for sealing the oil in the bearings. The screw valve 307 in the conduit 279 is provided to control the flow of oil from the reservoir 273 to the crank case 17. The conduit 308, a branch of the conduit 280, and controlled by needle valve screw 309, is provided for lubricating the rocker arms and rollers of the valve actuating units.

The exhaust trough 310 secured to the base plate at 311 and 312 is provide with sufficient clearance from the casing to permit the rotor to revolve and is adapted to receive the exhaust from the engine.

In order to cool the engine, the fins 313 are provided along the walls of the annular casing 11 by which the air is impelled and forced to pass between the fins and carry off the heat.

In operation, assuming that the rotor or casing 1 is revolved in a clockwise direction indicated by the arrow from the position shown in Figure 2. The connecting rod 83, connected to the crank pin 72 of the stationary crank shaft 71, and coupled to the links 91 and 96 through the wrist pin 85, which is mounted to freely slide radially back and forth in the radial grooves 87 and 88, formed in the radial walls 18 and 19 of castings 2 and 3, the shaft end 92 of the link 91, coupled to the piston carrying wheel 45, and the shaft end 97 of link 96, coupled to the piston carrying wheel 56, are all acted upon by the force delivered from the casing to the wrist pin, tending to revolve the connecting rod 83 on the crank pin 72. Obviously the revolving of the rod exerts to pull on the links 91 and 96, link 96, having its shaft end 97 pointing in the direction of rotation and coupled to the piston carrying wheel 58 and link 91 having its shaft end 92 pointing in the opposite direction to that of the rotation and coupled to piston carrying wheel 45 causes a positive acceleration of the piston carrying wheel 58 and consequently the pistons 29 and 31 and a negative acceleration of the piston carrying wheel 45 and consequentially the piston 28 and 30 in respect to that of the speed of the casing, thus causing the space 35 between pistons 30 and 31 to increase throughout the first quarter of the circle and consequentially causing a partial vacuum therein, as the casing is revolved.

As the casing is revolved and just out of the initial position shown in Figure 2, the roller 230 in the rocker arm 225 engages the intake cam 240, rocks the arm 226 and consequentially actuates the valve 141 through connection of the tappet screw 228 engaging the valve stem 149. As the valve 141 leaves its seat the partial vacuum in the chamber 35 draws gas from the carburetter 116 through the L chamber 111, the intake manifold 109, the centrifugal gas chamber 107, the intake port 137, the valve chamber 133, port 129, and into chamber 35. The charging cycle of the firing chamber 35 continues throughout the first quarter of the circle at which time the roller 230 passes out of engagement with the cam 240 and the intake valve 141 is returned to its seat by the valve spring 161 closing off the gas to the chamber.

As the casing revolves through the first quarter, the knee formed by the links 91 and 96 is gradually pulled in until both links lie in a straight line, at which time the casing is revolving out of the first, and entering into the second quarter of the circle, at this point an alternation of magnitude of the speed of the piston carrying wheels 45 and 58 occur, due to the pull of the connecting rod 83 on links 91 and 96, causing the links to knee in towards the axis of the engine, obviously the shaft end 97 of link 96 is drawn in the reverse direction of rotation, while the shaft end 92 of link 91 is drawn in the direction of rotation, thus causing a positive acceleration of the piston carrying wheel 45, and consequentially the pistons 28 and 30, and a negative acceleration of the piston carrying wheel 58, and consequentially the pistons 29 and 31, and thus reducing the chamber 35 between the pistons 30 and 31 throughout the second quarter of the circle, causing the gas therein to be compressed, while chamber 34 following in the rear of chamber 35 is being expanded and causing a partial vacuum therein. As the casing revolves out of the first quarter and into the second quarter, the roller 230 on the arm 225 of the rocker arm unit 208 engages the intake cam 240, rocking the arm 226 and the tappet screw 228 engage therein, abutting the valve stem 148 of the intake valve 140, forcing the valve away from its seat portion 144, and establishing communication from the firing chamber 34 to the carburetter 116. The vacuum in the chamber 34 tends to draw the gas from the carburetter 116 to the L chamber 111, and the intake manifold 109, the centrifugal gas chamber 107, the intake port 136, through the valve chamber 132, and through the port 128, into the chamber 34 and the charging cycle of the chamber 34 continues throughout the second quarter of the circle at which time the roller 230 passes out of engagement with the intake cam 240, permitting the valve 140 to return to its seat 144 through the instrumentality of the valve spring 160, and thus closing off the gas to the chamber 34.

Figure 14:
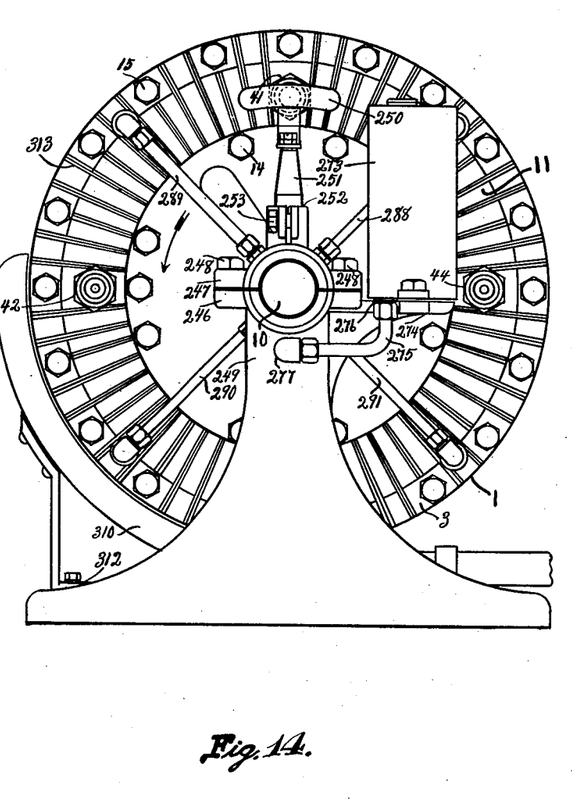
Figure 14 is an opposite end view of the entire machine showing the bearings which supports the rotor, the electrode supported by a porcelain post which in turn is secured to the bearing cap, the spark plugs and the oil reservoir.
Figure 15:
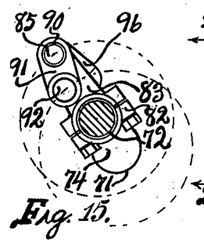
Figure 15 shows the connecting rod, the wrist pin and toggle joint links in corresponding position to that shown in Fig. 2 where one chamber is shown in firing position.
Figure 16:
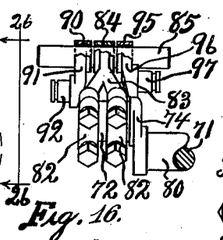
Figure 16 is a view of Figure 15 taken on the line 16—16 looking in the direction of the arrow, showing clearly the manner in which the wrist pin is coupled to the toggle joint link and to the connecting rod.
Figures 17, 18:
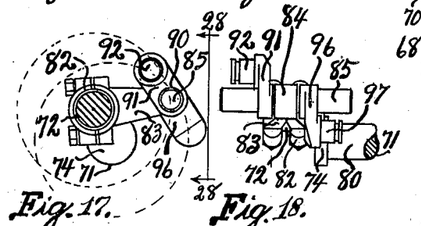
Figure 17 shows the connecting rod, toggle joint links and the wrist pin shaft where a second chamber is shown in firing position.
Figure 18 is a view of Figure 17 taken approximately on line 18—18 looking in the direction of the arrow to show clearly the position of the links.
Figure 19:
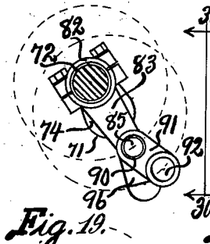
Figure 19 shows the connecting rod, the wrist pin shaft and toggle joint links where a third chamber is shown in firing position.
Figure 20:
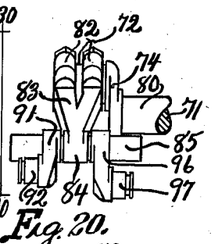
Figure 20 is a view of Figure 19 taken on line 20—20 looking in the direction of the arrow.
Figures 21, 22:
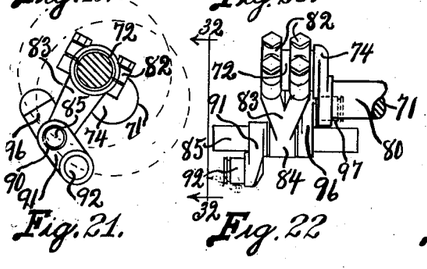
Figure 21 shows the connecting rod, wrist pin shaft and toggle joint links where the fourth chamber is shown in firing position.
Figure 22 is a view of Fig. 21 taken on line 22—22 looking in the direction of the arrow.

As the casing revolves out of the second and into the third quarter of the circle, the gas in the chamber 35, between the pistons 30 and 31, is then at its highest point of compression, and the spark plug 43, communicating with the chamber 35, is then in contact with the electrode 250, in the order as shown in Figures 1 and 14. At this point the roller 222 engages the cam portion 255 of the ignition shaft 256 causing the shaft to abut the contact arm and breaking the ignition primary circuit thus permitting electrical oscillation of an induction coil, which supply an electric current to the electrode, thence to the plug 43, thus igniting the gas in the chamber 35. The explosion pressure in the chamber expands between the pistons 30 and 31 and exerts to pull the link 91 by its shaft end 92 coupled to the piston carrying wheel 45, and to pull the link 96 by its shaft end 97, coupled to the piston carrying wheel 58, tending to pull the links in a straight line, thus applying a pulling force to the crank shaft pin 72, through the connecting rod 83 connected thereto. The crank shaft rigidly mounted in a fixed position resists the force which is reflected to the annular casing through the wrist pin 85, engaging the radial grooves 87 and 89, and as the wrist pin 85 is carried off the line of dead center with the crank pin, the force is then applied to and revolves the casing. We can now assume that the engine is revolving on its own power.

As the rotor revolves out of the second and into the third quarter of the circle, an alternation of magnitude of the speed of the piston carrying wheels 45 and 58 occurs, causing a positive acceleration of the piston carrying wheel 58, and consequentially pistons 29 and 31, and a negative acceleration of the piston carrying wheel 45, and consequentially pistons 28 and 30, thus causing the explosion chamber 34, between the pistons 29 and 30, to contract and compress the gas therein throughout the third quarter, while at the same time chamber 33 diametrically opposite chamber 35 is caused to expand throughout the third quarter of the circle creating a partial vacuum therein while the explosion in the chamber 35 continues to expand between the pistons 30 and 31, and revolve the casing. The roller 230 engaging the rocker arm 225 of the valve actuating unit 207, engages intake cam 240, rocking the arm 226, and the tappet screw 228 engaging the valve stem 147, actuating the intake valve 139 to an open position and the partial vacuum in the chamber 33, tends to draw gas from the carburetter 116, through the L chamber 111, the intake manifold 109, the centrifugal gas chamber 107, intake port 135, through the valve chamber 131, the port 127, and into the chamber 33. The charging cycle of the explosion chamber 33 lasts throughout the third quarter turn of the rotor, at which time the roller 230 passes out of engagement with the intake cam 240, permitting valve 139 to return to its seat and closes off the gas to the chamber 33.

The explosion in the chamber 35 continues to expand between the pistons 30 and 31, rotating the casing throughout the third quarter of the circle. The gas in the chamber 34 reaching its highest point of compression, and the spark plug 42, communicating with the chamber 34 is now in contact with the electrode 250. See Figure 1. At this point the roller 222, of the valve actuating unit 208, engages the cam portion 255 of the ignition shaft 256 causing the shaft to abut the contact arm and breaking the ignition primary circuit and thus causing the oscillation of the induction coil to supply the electric current to the electrode, thence to the plug 42, igniting the gas in the chamber 34. The explosion pressure in the chamber expands between the pistons 29 and 30 and exerts a pushing force on link 91 at its shaft end 92, coupled to the piston carrying wheel 45, and the link 96 at its shaft end 97 coupled to the piston carrying wheel 58, tending to knee out the links, thus applying a pulling force to the crank shaft pin 72 through the connecting rod 83 connected thereto. The crank shaft resists the force which is reflected to the annular casing through the wrist pin 85, and the radial grooves 87 and 89, as the engine is revolved off the dead center line from inertia of the casing, the force is then applied to and continues to revolve the casing.

As the rotor revolves out of the third quarter and into the fourth quarter of the circle an alternation of magnitude of the speed of the piston carrying wheels 45 and 58 occurs, causing a positive acceleration of the piston carrying wheel 45 and consequentially pistons 28 and 30, and a negative acceleration of the piston carrying wheel 58, and consequentially pistons 29 and 31, thus causing the explosion chambers 33 and 35, which are diametrically opposite each other to contract and compress the gas throughout the fourth quarter of the circle while the chambers 34 and 36 opposite each other, are in the process of expanding. A partial vacuum is then created, in the chamber 36 while the explosion pressure expands in the chamber 34 and rotates the casing, the roller 230 carried in arm 225 of the valve actuating unit 210 engages the intake cam 240 rocking the arm 226 and the tappet 228, which engages the valve stem 150 actuating the intake valve 142 to an open position. The partial vacuum created in the chamber 36, and the centrifugal action of the gas in the centrifugal gas chamber 107, causes the gas to flow from the carburetter 116 through the L 111, the intake manifold 109, through the centrifugal gas chamber 107, through the intake port 138, the valve chamber 134 and the port 130 and into the chamber 36. The charging cycle of this chamber 36 continues throughout, and to the end of the fourth quarter, of the circle at which time the roller 230 rolls out of engagement with the cam 240 permitting the valve 142 to return to its seat and closing off the gas to the chamber 36.

It is apparent that the gas in the chamber 35, propelling the rotor throughout the third quarter and into the beginning of the fourth quarter of the circle, has exhausted its energy, and at this point the roller 222, in the arm 214 of the valve actuating unit 209, is then carried into engagement with the exhaust cam 239 rocking the arm 215 and tappet screw 220, engaging the valve stem 185, actuating the exhaust valve 177 to an open position, and as the rotor continues to turn through the fourth quarter, the contracting of the explosion chamber 35, and the added centrifugal force, tends to discharge the exhaust gas from the chamber 35 through the port 129, the valve chamber 133, the exhaust port 173, and out into the exhaust trough 310, thence to the atmosphere. The exhaust cycle of the chamber 35 continues throughout and to the end of the fourth quarter of the circle, at which time the roller 222 passes out of engagement with the cam 239, releasing the exhaust valve 177, which is then returned to its seat 181, by the force of the valve spring 197, thus closing off the exhaust port 173, and at this point the chamber 35 is then in a position to take in a fresh charge of gas, and the roller 230 of the actuating unit 209 begins to engage the intake cam 240, which gradually opens the intake valve 141, thus permitting a new charge of gas into the chamber.

The explosion in the chamber 34 expanding between the pistons 29 and 30, drives the rotor throughout and to the end of the fourth quarter during which time the gas in the chamber 33, reaching its highest point of compression, and the spark plug 41 in communication with the chamber 33 is then registering contact with the electrode 250, at which time the roller 222 of the valve actuating unit 207, engages the cam portion 255 of the ignition shaft 256, causing the shaft to abut the contact arm at the insulator part 262, and breaking the ignition primary circuit, and to cause electrical oscillation of the ignition coil, which supplies an electric current to the electrode, thence to the plug 41, and igniting the gas in chamber 33. The explosion expands between the pistons 28 and 29 and continues to propel the rotor, and it is apparent that impulses of explosions are applied to the rotor or the casing, one after another in regular order, and continues to revolve the engine.

While I have shown my invention as embodied in a rotary internal combustion motor it is obvious that in some of its aspects it might be applicable to engines other than the internal combustion type.

It is of course understood that various changes and modifications may be made in details of construction and designs of the above specifically described embodiment of the invention without departing from the spirit thereof. Such changes and modifications are restricted only by the scope of the following claims.

What I claim is:

1. A rotary internal combustion engine comprising a base, a crankshaft fixed at one end to said base, a casing rotatably mounted on said crankshaft, crosshead guide means extending radially from the axis of and fixed to said casing, an annular chamber in said casing provided with circumferentially spaced apart combined intake and exhaust ports, a plurality of pairs of pistons in said annular chamber, piston carrying members rotatably mounted on said crankshaft coupled to and carrying said pistons in pairs, toggle joint means connected to and coupling together in pairs said piston carrying members, a connecting rod connected to the crankpin part of said crankshaft and to the knee-joint of said toggle joint means, and a crosshead pin connected in the knee part of said toggle joint means the head part of said connecting rod and slidably engaged to said crosshead guide means.

2. A rotary internal combustion engine comprising a base, a crankshaft fixed to said base, a casing rotatably mounted on said crankshaft, crosshead guide means fixed to said casing, an annular chamber in said casing, pistons in said chamber, piston carrying members rotatably mounted on said crankshaft and connected to said pistons, toggle joint means connected to and coupling together in pairs said piston carrying members, a connecting rod connected to the offset of said crankshaft and to the knee part of said toggle joint means, and wrist pin means operatively connecting the knee part of said toggle joint means and the head end of said connecting rod to said crosshead guide means.

3. A rotary internal combustion engine comprising a base, a crank shaft fixed to said base, a casing providing an annular firing chamber and rotatably mounted on said crank shaft, four pairs of coupled pistons in said firing chamber, two piston carrying members rotatably mounted on said crankshaft and coupled each to alternate pairs of pistons so that opposed pistons of adjacent pairs are coupled to different carrying members, a toggle connection between said carrying members, a connecting rod coupling the crank pin of said crankshaft and the knee-joint of said toggle connection, radial guiding means secured to and rotatable with said casing, a crosshead pin extending through said knee-joint and the end of said connecting rod connected to said knee-joint, said pin slidably engaging said radial guide.

4. A rotary internal combustion engine comprising a base, means providing an annular firing chamber rotatably mounted on said base, a plurality of coupled pairs of pistons in said firing chamber, piston carriers rotatably mounted on said base and coupled each one to alternate pairs of pistons, opposed pistons of adjacent pairs being coupled to different of said carriers whereby the carriers receive forces in opposite directions when firing occurs between opposed pistons of adjacent pairs, a crank pin fixedly mounted on said base in eccentric position with relation to the axes of rotation of said firing chamber means and said piston carriers, a toggle connection between said piston carriers, a connecting rod between the knee-joint of said toggle connection and the offset of said crank pin, radial guiding means fixed to and rotatable with said firing chamber means, and a cross-head pin extending through the knee-joint of said toggle connection and the end of the said connecting rod connected to said knee-joint, said pin slidably engaging said radial guiding means.

5. A rotary internal combustion engine comprising a base, means providing an annular firing chamber rotatably mounted on said base, a plurality of pairs of pistons in said firing chamber, piston carrying members rotatably mounted on said base coupled to and carrying said pistons in pairs, a toggle connection coupling said piston carrying members, a connecting rod connected at one end to the knee-joint of said toggle connection, means rotatably supporting the opposite end of said connecting rod eccentrically on the base with respect to the axes of said firing chamber means and said piston carrying members, means connected to and rotatable with said firing chamber means to provide radial crosshead guides, and a cross head pin extending through the knee-joint of said toggle connection and said one end of the connecting rod and slidably engaged in said crosshead guides.

6. A rotary engine comprising a base, a crank shaft fixed to said base, a casing providing an annular chamber and rotatably mounted on said crank shaft, radial crosshead guide means secured to and carried by said casing, pistons in said chamber, piston carrying members rotatably mounted on said crank shaft and coupled each to alternate pairs of said pistons so that opposed pistons of adjacent pairs are coupled to different carrying members, toggle joint means between and coupling together in pairs said piston carrying members, a connecting rod having its head end coupled to the knee joint of said toggle joint means and its foot end connected to the crank pin of said crank shaft, and a cross head means connected to the knee joint of said toggle joint means the head end of said connecting rod and slidably connected to said crosshead guide means.

7. An engine comprising a circular casing, an annular chamber formed in and axially of said casing, pistons in said chamber, piston carrying members rotatably mounted axially of said casing and said annular chamber coupled to and carrying said pistons, crosshead guide means extending radially from the axis of and fixed to said casing, a crank shaft rotatably mounted axially of said casing and said piston carrying members, toggle joint means between and coupling together in pairs said piston carrying members, a connecting rod its head end connected to the knee joint of said toggle joint means and its foot end connected to the crankpin part of said crank shaft, and crosshead means connected to the head end of said connecting rod the knee joint of said toggle joint means and to said crosshead guide means.

8. A rotary engine comprising a base, a crank shaft fixed to said base, a casing providing an annular chamber and rotatably mounted on said crank shaft, radial crosshead guide means carried by said casing, pistons slidable in said chamber, piston carrying members rotatably mounted on said crank shaft and coupled each to alternate pairs of said pistons, toggle means pivotally connected at one end thereof to said piston carrying members, a connecting rod pivoted at one end thereof on said crank shaft, and a cross head carried by the opposite end of said connecting rod and pivotally engaging the opposite ends of said toggle means to thereby form a knee joint, said cross head projecting laterally of said toggle means and slidably engaging said guide means.

ERNEST J. SERPAS.